United States Patent
Xu et al.

(10) Patent No.: US 12,431,970 B2
(45) Date of Patent: Sep. 30, 2025

(54) METHODS, DEVICES, APPARATUSES, AND MEDIUM FOR OPTICAL COMMUNICATION

(71) Applicant: Nokia Solutions and Networks Oy, Espoo (FI)

(72) Inventors: Wenyi Xu, Shanghai (CN); Dongxu Zhang, Shanghai (CN); Chenhui Ye, Shanghai (CN); Vincent Houtsma, New Providence, NJ (US); Jilan Xu, Shanghai (CN); Yuyang Zhang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/579,987

(22) Filed: Jan. 20, 2022

(65) Prior Publication Data
US 2022/0239371 A1    Jul. 28, 2022

(30) Foreign Application Priority Data

Jan. 25, 2021   (CN) ......................... 202110096879.4

(51) Int. Cl.
*H04B 10/07*    (2013.01)
*G06N 3/08*    (2023.01)
(Continued)

(52) U.S. Cl.
CPC .......... *H04B 10/0795* (2013.01); *G06N 3/08* (2013.01); *H04B 10/25073* (2013.01);
(Continued)

(58) Field of Classification Search
CPC .......... H04B 10/0795; H04B 10/25073; H04B 10/6165; H04B 10/0793; H04B 10/272;
(Continued)

(56) References Cited

U.S. PATENT DOCUMENTS

| 2016/0358098 | A1 | 12/2016 | Duesterwald et al. |
| 2019/0042937 | A1* | 2/2019 | Sheller ..................... G06N 3/08 |

(Continued)

FOREIGN PATENT DOCUMENTS

| CN | 109190760 A | 1/2019 |
| CN | 109905337 A | 6/2019 |

(Continued)

OTHER PUBLICATIONS

Acai Tan, "The Research on Equalization and Multiplexing Technology in Software Defined Optical Transceiver", School of Communication and Information Engineering, Shanghai University, May 2019.

(Continued)

*Primary Examiner* — Dibson J Sanchez
(74) *Attorney, Agent, or Firm* — Harness, Dickey & Pierce, P.L.C.

(57) ABSTRACT

The method includes receiving, at a first optical communication device, feedback information on training of a neural network from at least one second optical communication device, the neural network configured to process a signal received from the first optical communication device, the feedback information at least including a training performance indication for training of the neural network conducted at the at least one second optical communication device; updating, based on the feedback information, a first initial parameter value set for the neural network maintained at the first optical communication device, to obtain a second initial parameter value set for the neural network; and transmitting the second initial parameter value set to at least one further second optical communication device, for training of the neural network to be conducted at the at least one further second optical communication device based on the second initial parameter value set.

21 Claims, 11 Drawing Sheets

(51) Int. Cl.
  *H04B 10/079* (2013.01)
  *H04B 10/2507* (2013.01)
  *H04B 10/61* (2013.01)
  *G06N 3/02* (2006.01)
  *H04J 14/02* (2006.01)
  *H04Q 11/00* (2006.01)

(52) U.S. Cl.
  CPC ........... *H04B 10/6165* (2013.01); *G06N 3/02* (2013.01); *H04B 10/07* (2013.01); *H04J 14/0227* (2013.01); *H04J 14/0242* (2013.01); *H04Q 11/0062* (2013.01); *H04Q 11/0067* (2013.01)

(58) Field of Classification Search
  CPC ........ H04B 10/07; G06N 3/08; G06N 3/0675; G06N 3/04; G06N 3/02; H04Q 11/0067; H04Q 11/0062; H04J 14/0227; H04J 14/0242
  USPC .......................................... 398/9–38, 43–103
  See application file for complete search history.

(56) References Cited

U.S. PATENT DOCUMENTS

| | | | |
|---|---|---|---|
| 2019/0089463 A1 | 3/2019 | Zhang et al. | |
| 2019/0227980 A1* | 7/2019 | McMahan | G06N 3/044 |
| 2019/0318238 A1* | 10/2019 | Nokbak Nyembe | G06N 5/043 |
| 2020/0027022 A1* | 1/2020 | Jha | G06N 3/08 |
| 2020/0092622 A1* | 3/2020 | Oh | G06N 20/00 |
| 2020/0343985 A1* | 10/2020 | O'Shea | H04B 17/373 |
| 2021/0119901 A1* | 4/2021 | Balakrishnan | H04L 47/32 |
| 2021/0287114 A1* | 9/2021 | Zhou | G06N 20/20 |
| 2022/0094464 A1* | 3/2022 | Olivés | H04L 1/1864 |
| 2022/0156574 A1* | 5/2022 | Anwar | G06N 20/00 |
| 2022/0182802 A1* | 6/2022 | Pezeshki | H04W 72/21 |
| 2022/0237523 A1* | 7/2022 | Kwon | G06N 20/20 |
| 2022/0366310 A1* | 11/2022 | Si | G06N 3/098 |
| 2023/0031387 A1* | 2/2023 | Si | G06N 3/098 |
| 2023/0039182 A1* | 2/2023 | Cheng | G06N 3/098 |
| 2023/0140715 A1* | 5/2023 | Shibata | H04Q 11/0062 398/58 |
| 2023/0196121 A1* | 6/2023 | Song | G06N 3/098 706/25 |
| 2023/0223028 A1* | 7/2023 | Thakkar | G06F 21/6245 704/270 |
| 2023/0267326 A1* | 8/2023 | Jiang | G06N 3/08 706/25 |

FOREIGN PATENT DOCUMENTS

| | | |
|---|---|---|
| CN | 110267127 A | 9/2019 |
| CN | 110838872 A | 2/2020 |
| CN | 111464465 A | 7/2020 |
| CN | 111490799 A | 8/2020 |
| CN | 112243166 A | 1/2021 |
| EP | 0755141 B1 | 10/2005 |
| WO | 2019/134687 A1 | 7/2019 |
| WO | 2019165980 A1 | 9/2019 |

OTHER PUBLICATIONS

F. Musumeci et al., "An Overview on Application of Machine Learning Techniques in Optical Networks," in IEEE Communications Surveys & Tutorials, vol. 21, No. 2, pp. 1383-1408, Secondquarter 2019, doi: 10.1109/COMST.2018.2880039.

Chinese Office Action dated Apr. 19, 2024 for corresponding Chinese Patent Application No. 202110096879.4 and its English-language translation.

\* cited by examiner

METHODS, DEVICES, APPARATUSES, AND MEDIUM FOR OPTICAL COMMUNICATION

CROSS-REFERENCE TO RELATED APPLICATIONS

This application claims priority to and the benefit of Chinese Patent Application No. 202110096879.4 filed on Jan. 25, 2021, the entire contents of each of which are incorporated herein by reference

FIELD

Embodiments of the present disclosure relate to the field of optical communication and more specifically, to methods, devices, apparatuses, and computer readable storage medium for optical communication.

BACKGROUND

For a new-generation of high-speed Passive Optical Network (PON), for example, a PON with a 50 Gbps or a higher rate, signals transmitted therein may be highly distorted and inferred by noise due to the imperfect channel response and high link loss budget requirements. An optical communication device serving as a signal receiving terminal needs to perform signal equalization through signal processing, so as to remove or reduce signal distortion or noise interference.

In recent years, Neural Network (NN)-based signal processing is becoming a promising signal processing approach. As compared with a traditional linear equalizer, the NN-based signal processing can automatically learn channel characteristics, and effectively recover original signals from received signals with both linear and non-linear distortions. Such high-performance signal processing is especially applicable for the PON.

SUMMARY

In general, embodiments of the present disclosure relate to an improved training solution for a neural network (NN) for signal processing in optical communication.

In a first aspect of the present disclosure, there is provided a method for optical communication. The method comprises: receiving, at a first optical communication device, feedback information on training of a neural network from at least one second optical communication device, the neural network being configured to process a signal received from the first optical communication device, the feedback information at least comprising a training performance indication for training of the neural network conducted at the at least one second optical communication device; updating, based on the feedback information, a first initial parameter value set for the neural network maintained at the first optical communication device, to obtain a second initial parameter value set for the neural network; and transmitting the second initial parameter value set to at least one further second optical communication device, for training of the neural network to be conducted at the at least one further second optical communication device based on the second initial parameter value set.

In a second aspect of the present disclosure, there is provided a method for optical communication. The method comprises: training a neural network at a second optical communication device, the neural network being configured to process a signal received from a first optical communication device; and transmitting, to the first optical communication device, feedback information on the training of the neural network, the feedback information at least comprising a training performance indication for the training of the neural network conducted at the second optical communication device.

In a third aspect of the present disclosure, there is provided a first optical communication device. The first optical communication device comprises: at least one processor; and a memory coupled with the at least one processor, the memory having instructions stored therein which, when executed by the at least one processing unit, cause the first optical communication device to perform the method according to the first aspect.

In a fourth aspect of the present disclosure, there is provided a second optical communication device. The second optical communication device comprises: at least one processor; and a memory coupled with the at least one processor, the memory having instructions stored therein which, when executed by the at least one processing unit, cause the second optical communication device to perform the method according to the second aspect.

In a fifth aspect of the present disclosure, there is provided a first optical communication apparatus. The first optical communication apparatus comprises: means for receiving feedback information on training of a neural network from at least one second optical communication apparatus, the neural network being configured to process a signal received from the first optical communication apparatus, the feedback information at least comprising a training performance indication for training of the neural network conducted at the at least one second optical communication apparatus; means for updating, based on the feedback information, a first initial parameter value set for the neural network maintained at the first optical communication apparatus, to obtain a second initial parameter value set for the neural network; and means for transmitting the second initial parameter value set to at least one further second optical communication apparatus, for training of the neural network to be conducted at the at least one further second optical communication apparatus based on the second initial parameter value set.

In a sixth aspect of the present disclosure, there is provided a second optical communication apparatus. The second optical communication apparatus comprises: means for training a neural network, the neural network being configured to process a signal received from a first optical communication apparatus; and means for transmitting, to the first optical communication apparatus, feedback information on the training of the neural network, the feedback information at least comprising a training performance indication for the training of the neural network conducted at the second optical communication apparatus.

In a seventh aspect of the present disclosure, there is provided a computer readable medium. The computer readable medium has instructions stored thereon, the instructions, when executed by at least one processing unit, causing the at least one processing unit to perform the method according to the first aspect.

In an eighth aspect of the present disclosure, there is provided a computer readable medium. The computer readable medium has instructions stored thereon, the instructions, when executed by at least one processing unit, causing the at least one processing unit to perform the method according to the second aspect.

It is to be appreciated that the Summary is not intended to identify key or essential features of embodiments of the present disclosure, nor is it intended to limit the scope of the present disclosure. Other features of the present disclosure will become readily anticipated through the following description.

BRIEF DESCRIPTION OF THE DRAWINGS

Embodiments of the present disclosure are presented by way of example, and their advantages are explained in more detail below with reference to the accompanying drawings, in which.

Throughout the drawings, the same or similar reference numerals represent the same or similar element.

DETAILED DESCRIPTION

Figure 1:
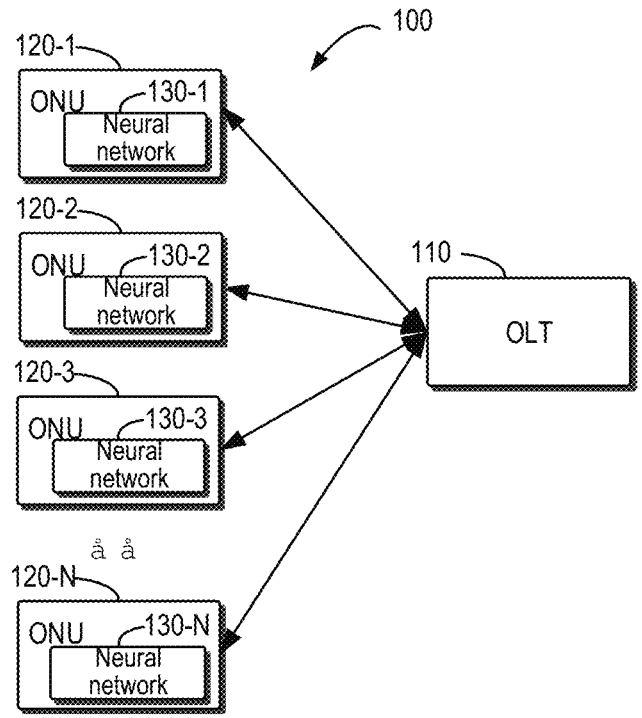
FIG. 1 illustrates a schematic diagram of an optical communication network in which the embodiments described in the present disclosure can be implemented.

The principle and spirit of the present disclosure will be described below with reference to several example embodiments shown in the figures. It should be appreciated that these specific embodiments are described only to enable those skilled in the art to better understand and implement the present disclosure, but not to limit the scope of the present disclosure in any way.

As used herein, the term "include" and its variants are to be read as open terms that mean "includes, but is not limited to." The term "based on" is to be read as "based at least in part on." The terms "an embodiment" and "the embodiment" are to be read as "at least one embodiment." The term "first," "second," and the like may refer to different or the same objects. Other definitions, either explicit or implicit, may be included below.

As used herein, the term "determine" encompasses a wide variety of actions. For example, "determine" may include operation, calculation, processing, deriving, investigating, looking up (for example, looking up in a table, database, or another data structure), asserting, and the like. In addition, "determine" may include receiving (for example, receiving information), accessing (for example, accessing data in a memory), and the like. In addition, "determine" may include analyzing, selecting, choosing, establishing, and the like.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(y) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit or a similar integrated circuit in OLT or other computing devices.

The term "optical communication device" or "optical communication apparatus" as used herein refers to an apparatus or device for communication in an optical fiber-based communication network. For example, examples of the optical communication apparatus or optical communication device may include an Optical Line Terminal (OLT), an Optical Network Unit (ONU), or any other optical network element suitable for use in an optical network such as a Passive Optical Network (PON) and any other Optical Transport Network (OTN).

The term "passive optical network" or "PON" as used herein means that an optical distribution network (ODN) included therein consists of passive devices such as optical splitters and optical fibers, without using active devices.

The term "neural network (NN)" used herein may be understood as a machine learning model. The model can learn an association between the corresponding input and output from training data, so that after the training is completed, a given input is processed based on a parameter value set obtained from the training to generate a corresponding output. "Neural network" sometimes may be referred to as "neural network model", "learning network", "learning model", "network", "model" or the like. These terms are used interchangeably herein.

Machine learning may be divided into three stages, i.e., a training stage, a test stage and an application stage (also referred to as an inference stage). In the training stage, a given learning model may be trained by using a large scale of training data, and continuously iterating and updating values of a parameter set of the model until the model can reach a desired objective. After the training, the values of the parameter set of the machine learning model are determined. In the test stage, test samples may be used to test the trained learning model to determine the performance of the learning model. In the application stage, real-world input data may be applied to the trained learning model. The learning model may process the real-world input data based on the parameter set obtained by the training to provide a corresponding output.

FIG. 1 illustrates a schematic diagram of an optical communication network 100 in which the embodiments described in the present disclosure can be implemented. The optical communication network 100 is an optical fiber-based communication network, and may, for example, be a PON. The optical communication network 100 includes a plurality of optical communication devices such as an OLT 110 and a plurality of (N) ONUs, namely, ONU 120-1, ONU 120-2, ONU 120-3, . . . , ONU 120-N (for ease of discussion, hereinafter collectively referred to as ONUs 120), where N is an integer greater than 1.

The OLT 110 and the ONU 120 may communicate with each other. For example, the OLT 110 may send a signal to the ONU 120, and the signal transmission in this direction is referred to as a downlink or a downstream link. The ONU 120 may also send a signal to the OLT 110, and the signal transmission in this direction is referred to as an uplink or an upstream link. In the example of FIG. 1, point-to-multipoint communication may be formed in the downlink direction between the OLT 110 and the plurality of ONUs 120.

It should be appreciated that the number of OLT and ONUs shown in FIG. 1 is given for the purpose of illustration. The optical communication network 100 may include any suitable number of OLTs and ONUs.

As shown in FIG. 1, the plurality of ONUs 120-1, 120-2, 120-3, . . . , 120-N include neural networks (NN) 130-1, 130-2, 130-3, . . . , 130-N for signal processing (for ease of discussion, hereinafter collectively referred to as neural networks 130), respectively. A neural network 130 is configured to process the signal received from the OLT 110 at an ONU 120, to reduce or eliminate distortion and/or noise in the received signal, thereby recovering the original signal sent by the OLT 110. The signal processing of the neural network 130 may include equalization processing, so the neural network 130 may be implemented as or included in an equalizer of the ONU 120.

As stated above, the neural network-based signal processing, such as equalization processing, may implement signal recovery more effectively. For communication channels with poor channel response and high link loss budget requirements, such as high-rate communication channels with 50 Gbps or a higher speed, the neural network-based signal processing can better improve the performance at the receiving end.

As shown in FIG. 1, the OLT 110 may include a signal processing device 112, which may include a photoelectric converter for converting an optical signal into an electrical signal. The signal processing device 112 may further include an equalizer that may recover the original signal transmitted by the ONU 120 from the distorted signal received at the OLT 110.

Although FIG. 1 only shows a neural network deployed at the ONU for signal processing, in some embodiments, a neural network may also be deployed at the OLT to process the signal received from the ONU.

Generally, it is needed to train a neural network before applying the neural network. During training of the neural network, an optical communication device at a transmitting end transmits a known pilot signal to an optical communication device at a receiving end. After receiving the distorted pilot signal via the communication channel, the optical communication device trains the neural network by using the received pilot signal and the known pilot signal as training data, so that the neural network can correctly recover the known pilot signal from the received pilot signal. In this way, the neural network has learned how to reduce or eliminate the distortion and noise interference introduced in the communication channel through which the pilot signal passes. As mentioned above, the training process of the neural network may iteratively update the values of the parameter set of the neural network until the neural network can recover the known pilot signal from the input received pilot signal using the parameter set obtained from the training.

In an optical communication-based network, for an optical communication device as the receiving end, a trained neural network closely depends on the channel condition between the optical communication device at transmitting end that is connected to this device, and thus is not applicable for optical communication devices at other receiving ends. This may cause problems, particularly in a point-to-multipoint communication network such as PON, because the channel conditions between a plurality of optical communication devices (such as ONUs) at receiving ends and a same transmitting end (such as the OLT) may vary. For example, there may be different optical fiber lengths, different bandwidths, and the like.

In order to ensure the application performance of the neural network, one solution is to perform self-training at the optical communication devices as the receiving ends separately, to train neural networks to be used for the communication channels between the optical communication devices and the corresponding transmitting end.

To ensure satisfied application performance of the neural network obtained from the training (for example, with the error reaches an expected level), a large scale of training data needs to be collected, that is, more pilot signals are received from the transmitting end, and there are a larger number of rounds of iteration of the neural network. This may increase the time and computing resources consumed in each time of training The Inventors discovered that in the self-training solution, starting from a randomly initialized parameter set, it may require more than 200,000 iteration steps and a large scale of training data to train a neural network with a satisfied error level. Therefore, if the neural network is trained separately through the self-training solution for each optical communication device as the receiving end in the optical communication network, the time and computing resources consumed for training may be larger for the whole network.

For a certain optical communication device, it is unfeasible to utilize a neural network previously trained by another optical communication device to initialize a neural network of this optical communication device and then train the locally-used neural network. The reason is that the neural network trained for one optical communication device is only suitable for the data set specific to its own communication channel, and cannot be quickly adapted to new context.

A joint-training solution is also proposed. This solution is to mix up the pilot signals received at a plurality of optical communication devices connected to the same transmitting end and to jointly train a neural network to be deployed to the plurality of optical communication devices. However, although the joint training can reduce the training time of the whole network, the application performance of this general neural network, e.g., the performance in the accuracy of signal processing, is worse than the neural network obtained by the self-training performed at an individual optical communication device. Therefore, the neural network obtained through the joint training may not meet the system requirements in various application scenarios. In addition, the general neural network may need to be designed as more complicated. Therefore, when being used in actual signal processing, the general neural network shows lower energy efficiency than the separately-trained neural network.

Figure 2:
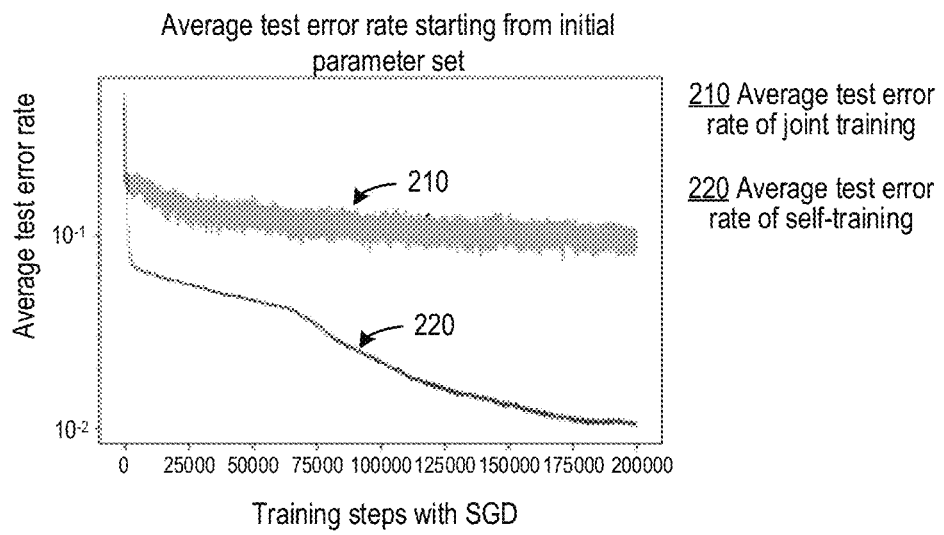
FIG. 2 illustrates a diagram of comparison of average test errors of a joint-trained solution and of a self-training solution for a neural network used for signal processing.

FIG. 2 illustrates a diagram of comparison of average test errors of a joint-trained solution and of a self-training solution of a neural network used for signal processing, where the horizontal axis represents training steps performed with a Stochastic Gradient Descent (SGD) algorithm during the training stage, and the vertical axis represents an average test error rate, such as a bit error rate (BER). The curve 210 of FIG. 2 shows the variation of the average test error rate of the joint training with the number of training steps, and the curve 220 shows the variation of the average test error rate of the self-training with the number of training steps. It is assumed that both the joint training and self-training are performed from a randomly-initialized parameter set. By comparing the curves 210 and 220, it can be seen that it is still difficult for the joint-training solution to obtain a satisfied low error rate after many training steps.

In summary, currently it is desired to quickly and efficiently complete the training of the neural network for signal processing to be deployed in the optical communication, with the trained neural network providing good performance at the same time.

According to embodiments of the present disclosure, there is provided an improved solution of training a neural network for signal processing in optical communication. In this solution, for a neural network configured to process a signal received from a first optical communication device, the first optical communication device maintains initial values of a parameter set (referred to as "an initial parameter value set") of the neural network. One or more second optical communication devices at the receiving end each train the neural network, and transmit feedback information including at least a training performance indication to the first optical communication device. The first optical communication device updates the maintained initial parameter value set based on the received feedback information. The updated initial parameter value set is provided to one or more further second optical communication devices, so that the further second optical communication devices can train the neural network based on the updated initial parameter value set.

It has been proved that the initialization of the parameter set of the neural network is important in achieving fast convergence and obtaining a reliable model. According to the solution of the present disclosure, by constantly updating the initial values of the parameter set of the neural network, the optical communication devices can train the neural network based on better initial values, thereby accelerating the training speed at the optical communication device and improving the accuracy and reliability of the neural network. Since the training is performed separately at each optical communication device, the trained neural network can quickly and reliably adapt to the channel condition between this optical communication device and the communication device sending the signal.

The principles and example embodiments of the present disclosure will be described in detail hereinafter with reference to the figures.

Figure 3:
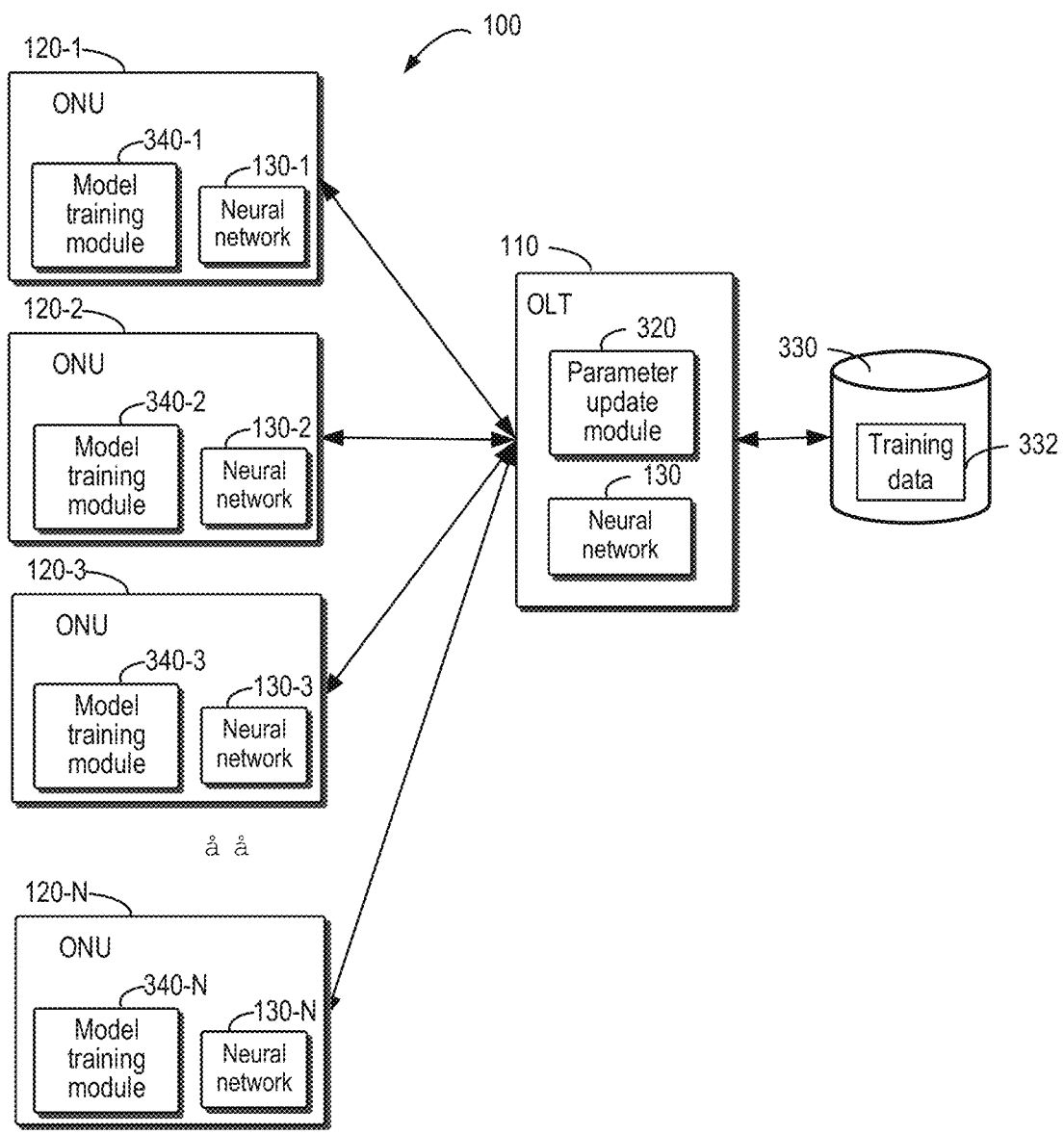
FIG. 3 illustrates a schematic diagram of an optical communication network in accordance with some embodiments of the present disclosure.

Reference is first made to FIG. 3, which shows a schematic diagram of an optical communication network 100 in accordance with some embodiments of the present disclosure. In the example of FIG. 3, the training of the neural network is implemented in the OLT 110 and the ONUs 120 of the optical communication network 100. In the following example embodiments, the OLT 110 serves as an example of the optical communication device at the transmitting end (sometimes referred to as a "first optical communication device"), and the ONUs 120 serves as the optical communication devices at the receiving end (sometimes also referred to as "second optical communication devices"). It should be appreciated that in other embodiments, the OLT 110 may also operate as an optical communication device at the receiving end, so that a neural network for processing the received signal may be deployed therein; and accordingly, an ONU 120 may operate as an optical communication device at the transmitting end.

An ONU 120 is configured to train the neural network 130 for processing a signal received via the communication channel with the OLT 110, for example, for performing equalization processing on the signal received from the OLT 110. In some examples, the neural network 130 may be implemented as or included in an equalizer of the ONU 120. According to embodiments of the present disclosure, the OLT 110 also maintains the initial values of the parameter set (herein referred to as a "parameter value set") of the neural network 130.

The neural network 130 may be configured as any type of neural network, such as a Forward Feedback Neural Network (FF-NN), a Recurrent Neural Network (RNN), a Convolutional Neural Network (CNN), and the like. Upon training or updating the neural network 130, the OLT 110 and the ONUs 120 may maintain the configuration about the structure of the neural network 130, including the number of network layers included in the neural network, the number of processing units (also referred to as neurons) in each network layer, the connectional relationship between the network layers, and so on. The structure of the neural network 130 is related to the type and actual requirements of the neural network, and the present disclosure is not limited in this regard.

In some embodiments, the parameter set of the neural network 130 may include weights. Optionally, the parameter set of the neural network 130 may further include biases. The training and updating of the neural network 130 may update specific values of the weights and biases. The parameter set of the neural network 130 depends on the configuration of its structure.

Figure 4:
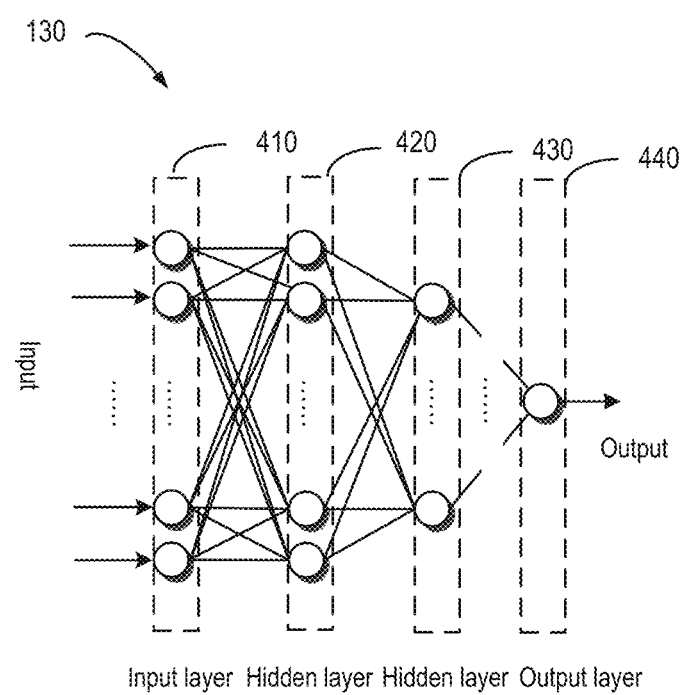
FIG. 4 illustrates a schematic diagram of a structure of a neural network in accordance with some embodiments of the present disclosure.

For ease of understanding, the weights and biases included in the parameter set used by the neural network will be explained with reference to FIG. 4. FIG. 4 shows a schematic diagram of the structure of the neural network 130 in accordance with some embodiments of the present disclosure. As shown in FIG. 4, the neural network may include an input layer 410, a plurality of hidden layers 420, 430, and an output layer 440. It should be appreciated that the neural network may also include other numbers of hidden layers and corresponding numbers of neurons. The protection scope of the present disclosure is also not limited in this regard.

In the embodiment shown in FIG. 4, the hidden layer 420 and the hidden layer 430 in the neural network 130 each include a plurality of neurons. Each of these neurons may include an activation function, and the activation function may be, for example, a non-linear or linear function. The function may, for example, be a sine function or other functions. In addition, the same activation function or different activation functions may be specified for respective neurons. The protection scope of the present disclosure is not limited in this regard.

The input of the neural network 130 is provided to the input layer 410, and then is input to the hidden layer 420 connected to the input layer 410. After the processing by the neurons in the hidden layer 420, their outputs are provided to the next hidden layer 430 for further processing. In one example, the input in the input layer 410 is fully connected to the neurons in the hidden layer 420, which means that, each input is provided to all neurons in the hidden layer 420. Therefore, the number of weights in the hidden layer 420 is as determined in the following Equation (1):

$$\text{The number of weights in the hidden layer 420} = \text{the number of inputs} * \text{the number of neurons in this hidden layer} \quad (1)$$

For example, if the number of inputs to the hidden layer 420 is 40 and the number of neurons in the hidden layer 420 is 40, the number of weights in the hidden layer 420 is 40*40=1600.

In addition, one or more neurons in each hidden layer may also have a corresponding bias(es). That is, the number of biases may be the same as or less than the total number of neurons in the hidden layer. For example, the hidden layer 420 with 40 neurons may have 40 biases. In this way, the operation performed by each neuron in the hidden layer 420 is that each input in the input layer 410 (for example, among the 40 inputs) is multiplied by one of the 40 weights, and is then added to a corresponding bias (i.e., input 1*weight 1+input 2*weight 2+input 3*weight 3 . . . input 40*weight 40+bias), and then a value may be output by the nonlinear activation function of each neuron. As a result, the 40 neurons of the hidden layer 420 each generate an output, and each output is input to the next hidden layer 430. Then, an operation similar to that performed in the hidden layer 420 is performed to obtain the corresponding output. Such an operation may be performed layer by layer backwards. The last hidden layer of the neural network 130 is connected to the output layer 440 to provide the output of the network.

It should be appreciated that the above fully-connected neural network is only shown as an example, and the neurons in each layer in the neural network may also be connected in a non-fully-connected manner. The protection scope of the present disclosure is not limited in this regard. In case that the structure of the neural network 130 is determined, the parameter set of the neural network 130 may be determined. The training of the neural network 130 is to update the parameter value set iteratively.

The OLT 110 further includes a parameter update module 320 configured to update the parameter value set of the neural network 130 based on feedback information on the training of the neural network 130 received from one or more ONUs 120. The OLT 110 may maintain training data 332 used for training of the neural network 130, which may be stored in a storage system 330. Specific examples of the training data 332 used at the OLT 110 will be discussed in detail below.

The ONUs 120-1, 120-2, 120-3, . . . , 120-N further include model training modules 340-1, 240-2, 240-3, . . . , 240-N, respectively, for training the neural network 130 used by themselves. As such, the neural network 130 deployed at each ONU 120 may be trained for the communication channel between the ONU 120 and the OLT 110, so that the neural network 130 trained on each device can all perform reliable and accurate processing on the signals received over the respective communication channels.

One or more ONUs 120 in the optical communication network 110 may receive an initial parameter value set for the neural network 130 from the OLT 110, so as to start the training of the neural network 130 on the basis of better initialization, to improve the training efficiency and model accuracy.

Hereinafter, the interaction between the ONUs 120 and the OLT 110 will be discussed in detail with reference to FIG. 5 and subsequent FIGS. 6-9 to implement the training of the neural network 130.

Figure 5:
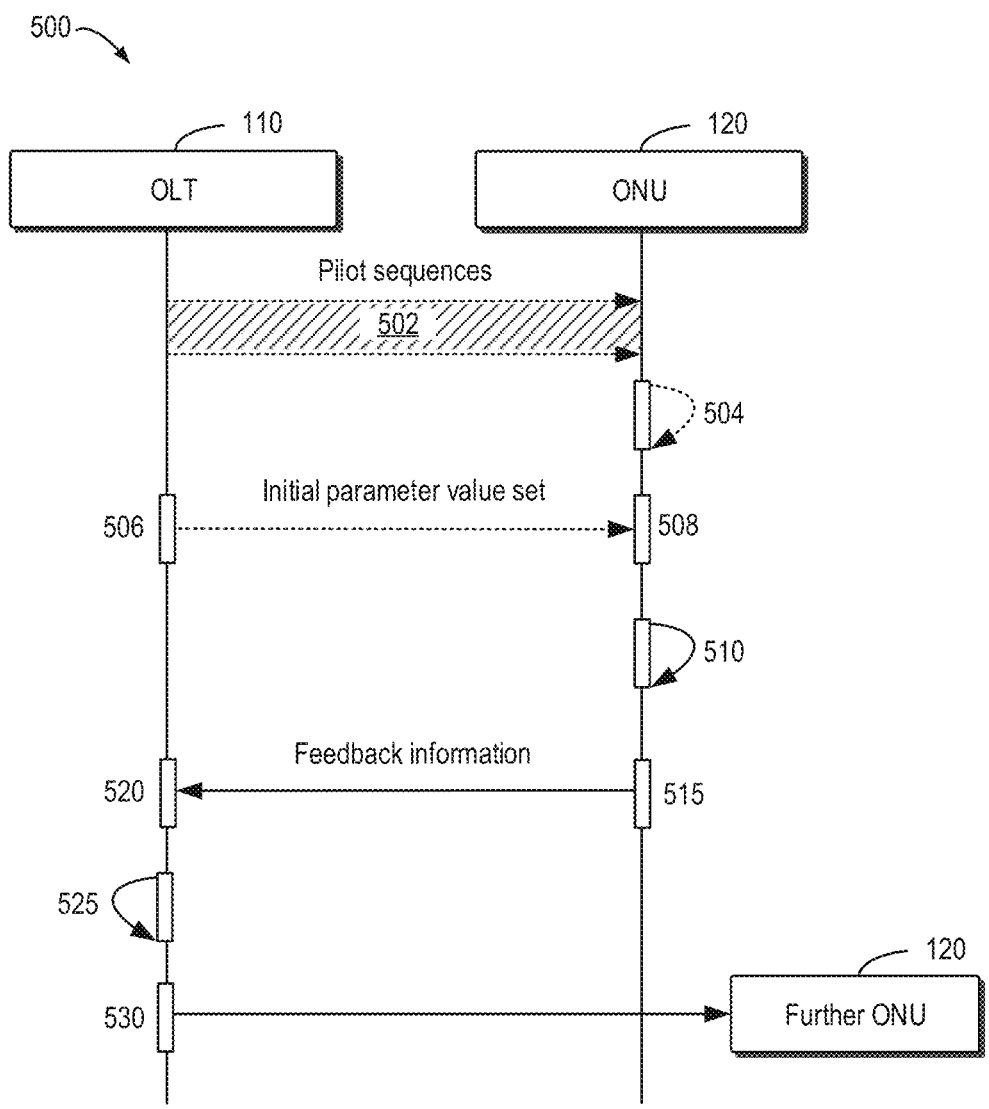
FIG. 5 illustrates a signaling diagram for an optical communication process between optical communication devices in accordance with some example embodiments of the present disclosure.

FIG. 5 illustrates a signaling diagram for an optical communication process between optical communication devices in accordance with some example embodiments of the present disclosure. For the purpose of discussion, the process 500 will be discussed with reference to FIG. 3. The process 500 may involve the OLT 110 and an ONU 120 shown in FIG. 3. The ONU 120 may be any ONU 120 in the optical communication network 110.

In the process 500, the ONU 120 trains 510 the neural network 130.

For example, the model training module 340 in the ONU 120 may be configured to train the neural network 130. In some embodiments, when the ONU 120 starts and joins the optical communication network 100, or when a specific communication channel of the OLT 110 is to be activated (for example, a communication channel with a high-rate wavelength, such as a communication channel with 50 Gbps or a higher rate), the ONU 120 may need to train the neural network 130. The neural network 130 is trained to process signals received from the OLT 110 subsequently to reduce or eliminate, from the received signals, the distortion, noise interference, and the like that are introduced during the transmission, thereby recovering the original signals.

The training of the neural network 130 at the ONU 120 may be based on the initial parameter value set of the neural network 130. The ONU 120 may initialize the parameter set of the neural network 130 using the initial parameter value set. The ONU 120 may obtain the initial parameter value set for training in various different ways.

In some embodiments, the OLT 110 transmits 506 the initial parameter value set to the ONU 120, and the ONU 120 receives 508 the initial parameter value set from the OLT 110. The OLT 110 may maintain and update the initial parameter value set for the neural network 130. In some embodiments, the initial parameter value set provided to one ONU 120 or some ONUs 120 may be the neural network 130 determined by the OLT 110 based on simulated training data. In some embodiments, the OLT 110 updates the initial parameter value set of the neural network 130 based on feedback information from other ONUs 120 for the training of the neural network 130, and provides the updated initial parameter value set to one or more ONUs 120. The determination of the initial parameter value set of the neural network 130 at the OLT 110 will be discussed in more detail below.

In some embodiments, when one or more ONUs 120 in the optical communication network 100 perform the training of the neural network 130, they may not receive the initial parameter value set from the OLT 110, and may instead perform training based on a default initial parameter value. For example, the default initial parameter value set may be a factory default set, for example, may be stored in a storage apparatus of the ONU 120 or other storage systems accessible by the ONU 120.

The training of the neural network 130 by ONU 120 is also based on training data. In some embodiments, the OLT 110 transmits 502 a plurality of pilot sequences to the ONU 120. The plurality of pilot sequences may be the same or different. These pilot sequences may have a predetermined bit pattern which may be known to both the OLT 110 and the ONU 120. In some embodiments, the OLT 110 may periodically send or broadcast the plurality of pilot sequences in downstream traffic. The ONU 120 may receive 504 the plurality of pilot sequences as training data for the neural network 130.

The plurality of pilot signals sent by the OLT 110 may arrive at different ONUs 120 via different communication channels with different condition (for example, having different fiber lengths, having different wavelengths, and/or the like). Therefore, the pilot sequences received at an ONU 120 may be different from the original pilot sequences sent by the OLT 110, and the pilot sequences received at different ONUs 120 may also be different. Since the ONU 120 knows the original pilot sequences sent by the OLT 110, ONU 120 may use the received pilot sequences as training data to train neural network 130, to enable the neural network 130 to recover the original pilot sequences from the received pilot sequences as accurately as possible. During the training process, the parameter set of the neural network 130 is updated iteratively from the initial parameter value set, until the convergence objective of the training is reached.

In some embodiments, a pilot sequence sent by the OLT 110 may be carried in a message with a predetermined frame structure. Such a message may include a physical (PHY) layer message. In some examples, the message carrying the pilot sequence may include a serial number request message periodically sent by the OLT 110 for discovering a new ONU.

Figure 6:
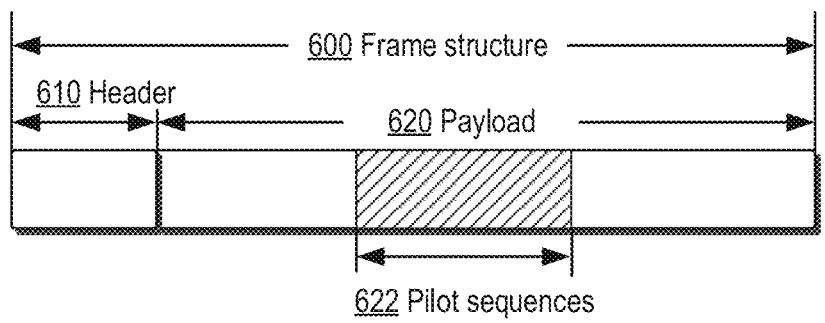
FIG. 6 illustrates an example of a frame structure for carrying a pilot sequence in accordance with some example embodiments of the present disclosure.

In some embodiments, a pilot sequence sent by the OLT 110 may be carried in a predetermined segment of a payload portion of a message having a predetermined frame structure. FIG. 6 illustrates an example of a frame structure 600 for carrying a pilot sequence in accordance with some example embodiments of the present disclosure. The frame structure 600 includes a header 610 and a payload portion 620. The predetermined segment of the payload portion 620 is used to carry a pilot sequence 622.

By carrying the pilot sequence carried in a predetermined segment of the payload portion, the normal frame structure used in the downstream link may not be interrupted. The OLT 110 may broadcast the message carrying the pilot sequence. An ONU 120 that does not need to collect the pilot sequence (for example, an ONU 120 that already has a normal communication state with the OLT 110) may directly ignore the pilot sequence in the payload portion. The ONU 120 that needs to collect the pilot sequence for training of the neural network 130 may quickly locate the pilot sequence from the payload, for example, locate the pilot sequence with a correlation window.

It should be appreciated that FIG. 6 shows an example for transmitting a pilot sequence. A pilot sequence may also be transmitted to the ONU 120 by other messages or signaling. Generally, in order to complete the training of the neural network 130, the ONU 120 may collect a certain number of pilot sequences from the OLT 110 as the training data.

In some embodiments, after obtaining the initial parameter value set and training data of the neural network 130 (for example, the pilot sequences received from the OLT 110), the ONU 120 may perform training of the neural network 130. The ONU 120 may use any suitable training algorithm to implement the training, and the embodiments of the present disclosure are not limited in this regard. In some embodiments, a training objective of the neural network 130 is to make the neural network 130 reach a predetermined convergence objective. For example, the accuracy of signal processing by the neural network 130 can reach the predetermined objective, for example, the error rate (for example, the BER) is lower than a specific threshold. Other convergence objectives for training are also feasible. The embodiments of the present disclosure are not limited in this regard.

After the training of the neural network 130 is completed at the ONU 120, the ONU 120 transmits 515 feedback information on the training of the neural network 130 to the OLT 110. The feedback information at least includes a training performance indication for training the neural network 130 at the ONU 120. The feedback information may indicate to the OLT 110 the training performance when the ONU 120 performs the training using the current initial parameter value set. As mentioned above, the initial parameter value set used by the ONU 120 may be an initial parameter value set that is currently maintained by the OLT 110, or may be a default initial parameter value set.

In some embodiments, the training performance indication in the feedback information may indicate the training efficiency of the training at the ONU 120 and/or the accuracy of the trained neural network. Specifically, the training performance indication may include first indication information indicating the time consumption for completing the training of the neural network 130 at the ONU 120. Alternatively or additionally, the training performance indication may further include second indication information indicating an error rate of the neural network 130 after the training of the neural network 130 is completed at the ONU 120. The lower the error rate, the higher the accuracy level.

The time consumption for training of the neural network 130 may be indicated by a plurality of indicators in the training process. In some embodiments, the first indication information may include the number of epochs used by the ONU 120 to complete the training of the neural network 130. In the training of the neural network, an epoch refers to using all training data to perform one complete round of training of the neural network, i.e., using all data to perform one time of forward propagation and one time of back propagation. Generally, in order to obtain an expected parameter value set (i.e., that meets a training objective), a plurality of epochs may be needed. A large number of epochs mean that the time consumed by the training at the ONU 120 is long. In some embodiments, the first indication information may include the number of iteration steps used by the ONU 120 to complete the training of the neural network 130. During the training of the neural network, all training data may be divided into several batches, and one iteration refers to training the neural network using a batch of training data. The training in one epoch may include a plurality of iterations. It should be appreciated that the first indication information may additionally or alternatively include other indicators that may be used to measure the time consumed by the ONU 120 for training the neural network 130.

In some embodiments, in order to indicate the error rate of the neural network 130 after the training, the second indication information may include a test bit error rate (for example, BER) during the test stage of the neural network 130, or an application bit error rate (for example, BER) in the application stage when the neural network 130 is put in use. In some embodiments, if the training of the neural network 130 by the ONU 120 is performed by minimizing a constructed loss function, the second indication information may also include a loss value of the loss function after the training is completed. The lower the loss value, the lower the error rate of the neural network 130 obtained by training, and the higher the accuracy rate.

At the OLT 110, the OLT 110 receives 520 the feedback information from the ONU 120, and updates 525, based on the feedback information, the maintained initial parameter value set for the neural network 130. For example, the parameter update module 320 in the OLT 110 is configured to update the initial parameter value set of the neural network 130. The initial parameter value set currently maintained by the OLT 110 is sometimes herein referred to as "a first initial parameter value set", and the updated initial parameter value set is sometimes herein referred to as "a second initial parameter value set".

According to the embodiments of the present disclosure, the OLT 110 can continuously optimize the initial parameter value set of the neural network 130 based on the training performance of the neural network 130 at one or more ONUs 120. In some embodiments, the feedback information from the ONUs 120, such as the training performance indications therein, facilitates the OLT 110 to determine whether to continue upgrading the initial parameter value set of the neural network 130 or not.

Specifically, the OLT 110 may determine whether the training performance at an ONU 120 satisfies a threshold performance based on the training performance indication. For example, if the training performance indication includes the first indication information indicating the time consumption of training, the OLT 110 may determine whether the time consumption of training (for example, the number of epochs) exceeds a certain predetermined time threshold. Alternatively or additionally, if the training performance indication includes the second indication information indicating the error rate of the training, the OLT 110 may determine whether the error rate exceeds a predetermined error threshold. If the OLT 110 determines that the training performance at the ONU 120 does not reach the threshold performance, the OLT 110 determines to continue to update the initial parameter value set.

In the initial stage, the initial parameter value set at the OLT 110 may be the same as the initial parameter value set used at an ONU 120 that is joined initially, for example, may be a default initial parameter value set, or as an initial parameter value set determined from simulated training data. If the OLT 110 determines that the training performance at the ONU 120 does not reach the threshold performance, the current initial parameter value set may not be used to facilitate the ONU 120 to train the neural network 130 faster and/or more reliably, and thus further update is needed.

In some embodiments, after receiving feedback information on the training of respective neural networks 130 from the plurality of ONUs 120, the OLT 110 may determine whether to continue to update the initial parameter value set based on whether the training performance at the plurality of ONUs 120 reach the threshold performance. For example, if the OLT 110 determines that the training performance at the plurality of ONUs 120 (for example, a number of ONUs 120 exceeding a threshold) is not satisfied, for example, the time consumption and/or the error rate exceeds the corresponding threshold, then the OLT 110 may determine to update the initial parameter value set.

The update of the initial parameter value set of the neural network 130 will be discussed in more detail below.

A better initial parameter value set helps train the neural network 130 to meet the expected objective faster and more reliably. Therefore, after completing the update of the initial parameter value set, the OLT 110 transmits the updated initial parameter value set (i.e., the "second initial parameter value set") to one or more further ONUs 120. The further ONUs 120 may, for example, be new ONUs 120 that are to establish communication channels with the OLT 110. Those ONUs 120 may use the updated initial parameter value set to train the neural networks 130 deployed, in order to use the trained neural networks 130 to process signals received from the OLT 110.

According to the embodiments of the present disclosure, with the continuous updates and optimization of the initial parameter value set of the neural network 130 by the OLT 110, the training speed of the neural network 130 by subsequent ONUs 120 may be accelerated. The ONUs 120 may be able to use a smaller amount of training data to perform fine-tuning on the initial parameter value set, so that the neural network 130 can reach the training objective faster. In this way, both the training data collection and the actual training process may be accelerated. It should be appreciated that the process 500 may be executed for a plurality of ONUs 120.

In some embodiments, after completing the training of the neural network 130, an ONU 120 may perform a channel activation stage with the OLT 110 to activate the communication channel for a specific wavelength. The ONU 120 may use the trained neural network 130 to process a signal received from the OLT 110 over the activated communication channel, for example, to perform equalization processing.

In some embodiments, after activating the communication channel, the ONU 120 may transmit feedback information on the training of the neural network 130 to the OLT 110 over the activated communication channel.

In the process 500, the OLT 110 may transmit to the ONU 120 the initial parameter value set for the neural network 130 maintained locally. For example, the OLT 110 transmits the initial parameter value set to the ONU 120 at 506. In addition, after updating the initial parameter value set, the OLT 110 transmits the updated initial parameter value set to a further ONU 120 at 530. When the initial parameter value set is transmitted to the ONU 120, the communication channel over which the neural network 130 is to be applied to perform signal processing between the ONU 120 and the OLT 110 may not have been activated. In this case, the OLT 110 may transmit the initial parameter value set to the ONU 120 through other communication approaches.

Figure 7A:
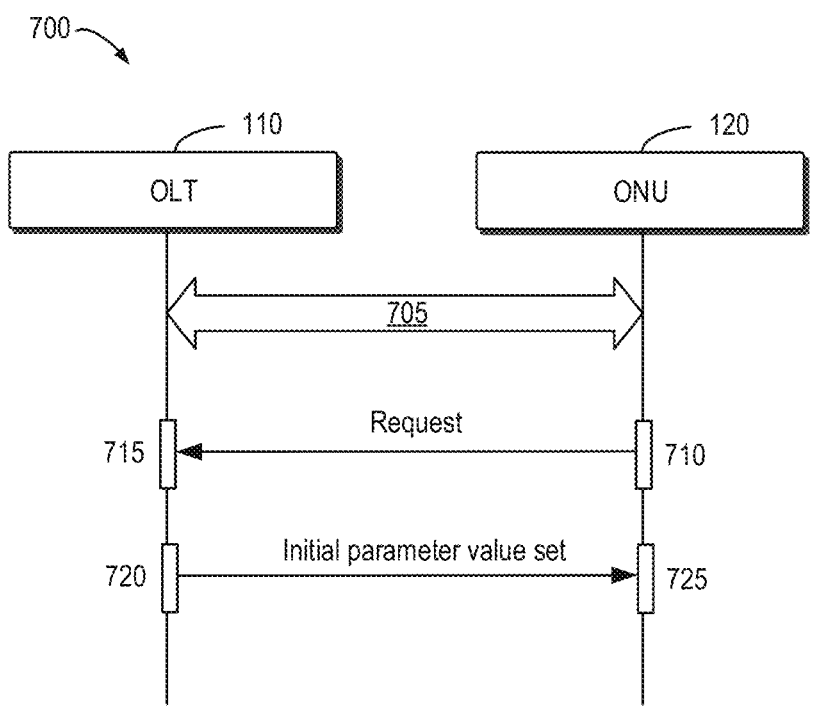
FIG. 7A illustrates a signaling diagram of a process for transmitting an initial parameter value set in accordance with some example embodiments of the present disclosure.
Figure 7B:
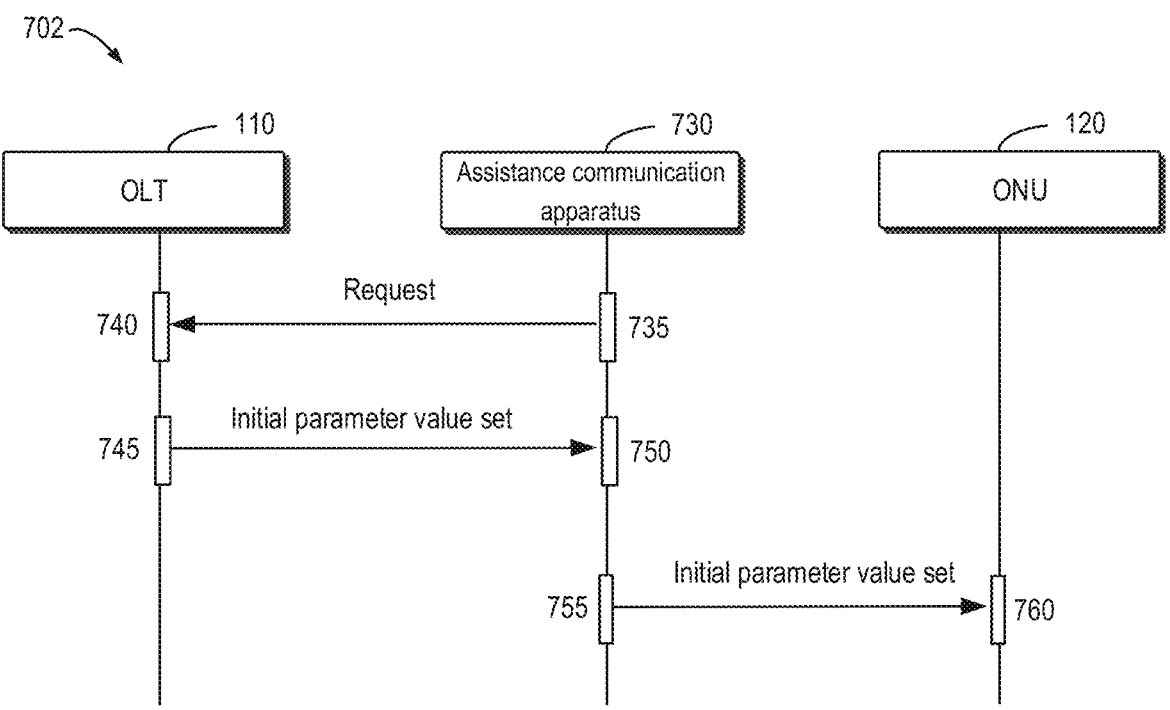
FIG. 7B illustrates a signaling diagram of a process for transmitting an initial parameter value set in accordance with some further example embodiments of the present disclosure.

FIG. 7A and FIG. 7B illustrate example processes 700 and 702 for transmitting an initial parameter value set in accordance with some example embodiments of the present disclosure. It is noted that in the processes 700 and 702, the ONU 120 may be any ONU that receives from the OLT 110 the initial parameter value set before or after the update.

In the example process 700 of FIG. 7A, it is assumed that the ONU 120 has a communication channel with a plurality of wavelengths for communications with the OLT 110. In the process 700, the ONU 120 and the OLT 110 perform 705 a channel activation process of a communication channel of a specific wavelength. The neural network 130 may be trained to perform processing of the signal received from the OLT 110 on the communication channel having a first wavelength. At 705, the ONU 120 may activate the communication channel having a second wavelength with the OLT 110 to receive the initial parameter value set. The second wavelength is different from the first wavelength. In some embodiments, the communication channel with the second wavelength may have a lower communication rate, so that the initial parameter value set may be reliably received.

In some embodiments, the ONU 120 may have an activated communication channel available for communication with the OLT 110, and thus the channel activation process in the process 700 may be omitted.

In the case of the presence of the activated communication channel, the ONU 120 transmits 710 a request for an initial parameter value set of the neural network 130 to the OLT 110 over the activated communication channel After receiving 715 the request, the OLT 110 transmits 720 the initial parameter value set to the ONU 120. After receiving 725 the initial parameter value set, as described above, the ONU 120 may start training the neural network 130 based on the initial parameter value set.

In some embodiments, the OLT 110 may directly carry the initial parameter value set in a periodic downlink control message (such as a serial number request of the ONU). Therefore, the parameter request steps at 710 and 715 in the process 700 may be omitted. In some embodiments, the initial parameter value set may be included in a Physical Layer Operations, Administration and Maintenance (PLOAM) message. In some embodiments, the initial parameter value set may be included in an ONU Management and Control Channel (OMCC) message. Certainly, other messages may also be used to transmit the initial parameter value set to the ONU 120.

In the example process 702 of FIG. 7B, it is assumed that the ONU 120 is communicatively coupled to an assistance communication apparatus 730. The assistance communication apparatus 730 may further communicate with the OLT 110. The assistance communication apparatus 730 is configured to forward the initial parameter value set received from the OLT 110 to the ONU 120.

Specifically, the assistance communication apparatus 730 transmits 735 a request for an initial parameter value set of the neural network 130 to the OLT 110. After receiving 740 the request, the OLT 110 transmits 745 the initial parameter value set to the assistance communication apparatus 730. After receiving the initial parameter value set 750, the assistance communication apparatus 730 further forwards 755 the received initial parameter value set to the ONU 120. After receiving 760 the initial parameter value set, as described above, the ONU 120 may start training the neural network 130 based on the initial parameter value set.

In some examples, the assistance communication apparatus 730 may be a communication module embedded in the ONU 120, such as an Internet of Things (IoT) module. The communication module may be implemented in hardware and/or software, and communicate with the OLT 110 through other communication technologies, for example, communicate with the OLT 110 through the mobile Internet.

In some examples, the assistance communication apparatus 730 may include a separate communication apparatus, which may be detachably connected to the ONU 120 for communication therewith. For example, the assistance communication apparatus 730 may be coupled to the ONU 120 via a Universal Serial Bus (USB) or other communication interfaces (for example, a serial communication interface such as RS232). In practical applications, such an assistance communication apparatus 730 may, for example, be manually installed to the ONU 120, to obtain the initial parameter value set for the ONU 120.

It should be appreciated that the assistance communication apparatus 730 may also include any other communication device. The embodiments of the present disclosure are not limited in this regard.

As mentioned above, the OLT 110 may update the initial parameter value set of the neural network 130 based on the feedback information from the ONU(s) 120. The update of the parameter set of the neural network 130 at the OTL 110 is also similar to the training process of the neural network, or may also be referred to as a pre-training process, because an ONU 120 will further fine tune the initial parameter value set obtained by training. The starting point for training the neural network 130 is the initial parameter value set currently maintained at the OLT 110.

In some embodiments, in order to train the neural network 130, the training data required by the OLT 110, such as the training data 332 in the storage system 330, may include the pilot sequences sent to the ONU(s) 120. In addition, the OLT 110 may also determine the pilot sequences that may be received at respective ONUs 120 as the training data 332 by means of simulation. For example, the OLT 110 may simulate the communication channels with different ONUs 120 to determine pilot sequences that may be received at the respective ONUs 120 via the simulated communication channels. The OLT 110 may perform the update of the initial parameter value set based on the simulated pilot sequences received at the ONUs 120.

In some embodiments, the feedback information fed back by one or more ONUs 120 to the OLT 110 after performing the training of the neural network 130 may also include part or all of the training data used for training the neural network 130. The training data here includes the pilot sequences received by the ONUs 120 from the OLT 110 via their respective communication channels. In this way, the OLT 110 may obtain real training data from the ONU 120 to perform the update of the initial parameter value set of the neural network 130 more effectively.

In some embodiments, the training data fed back from an ONU 120 may be provided to the OLT 110 along with the training performance indication, for example, may be transmitted to the OLT 110 at 515 in the process 500. In some embodiments, the ONU 120 may transmit the training performance indication and the training data to the OLT 110 separately. In an embodiment, after determining that the initial parameter value set of the neural network 130 is to be updated, the OLT 110 may send a request to the ONU 120 at which the training of the neural network 130 has completed, to request the ONU 120 to transmit previous update on the initial parameter values of the neural network 130.

The OLT 110 may collect real training data used by the plurality of ONUs 120 respectively, to update the initial parameter value set of the neural network 130. In some embodiments, instead of using only training data from one ONU 120 or mixing up training data from different ONUs 120, the OLT 110 may train the neural network 130 through a Model Agnostic Meta Learning (MAML) process. The MAML may combine learning losses of a plurality of models learned in different environments (also referred to as tasks), and compute the loss with new data to update the model, thereby improving the model robustness.

Since the OLT 110 is connected to different ONUs 120 with different communication channels, these different communication channels correspond to different environments. The neural networks 130 trained at different ONUs 120 are in fact to learn features of the different communication channels, respectively. At the OLT 110, common features learned by the neural network 130 at different ONUs 120 may be obtained through the MAML, so that the updated initial parameter value set can better facilitate the neural network 130 to quickly adapt to a new environment, i.e., to train the neural network 130 at a new ONU 120 more quickly to meet an expected objective. In addition, the application of MAML enables the OLT 110 to collect a small amount of real training data from a single ONU 120 to complete the update of the parameter values.

For ease of understanding, the algorithm of the MAML is first introduced simply. When the MAML is used to train a neural network, in each iteration of training, training data D and D' of a plurality of tasks may be randomly selected from the training data corresponding to different tasks. For D of each task Ti, the learning loss is calculated to update the gradient, such as a gradient descent (GD), as follows:

$$\varphi = \theta - \alpha \nabla L\ Ti(f(\vartheta)) \quad (2)$$

where φ represents a gradient of the task Ti, θ represents a total gradient of the neural network in this training step, ∇L Ti(f(ϑ)) represents the learning loss of the task Ti. i.e., the loss value of the loss function of the neural network in the task Ti, which is determined, for example, by forward propagation and backward propagation processes after applying the training data of the task Ti to the neural network; α represents a learning rate for the task Ti, which may be a predetermined value, and may be the same or varied for each task.

After the gradient φ of each of the plurality of randomly-selected tasks (assumed to be N tasks) is determined, a total gradient θ of the neural network is updated by re-calculating the gradients of the plurality of tasks for the D' model. For example, such an update may be represented as:

$$\theta = \theta - \beta \Sigma_{Ti-N} \nabla L\ Ti(f(\varphi)) \quad (3)$$

where ∇L Ti(f(φ) represents the learning loss determined based on the gradient φ of the task Ti, and β represents a learning rate, which may be a predetermined value.

The total gradient θ of the whole neural network may be updated iteratively in a plurality of training steps. After the iterative update reaches the expected objective, for example, the iteration number reaches a threshold, or the loss value of the neural network is less than a predetermined threshold, the update of the initial parameter value set of the neural network is completed.

In some embodiments, the update of the initial parameter value set of the neural network 130 by the OLT 110 may include an update using simulated training data and an update using real training data obtained from the ONU(s) 120. For example, the OLT 110 may also use the MAML process to train the neural network 130 using the simulated training data and real training data.

Figure 8:
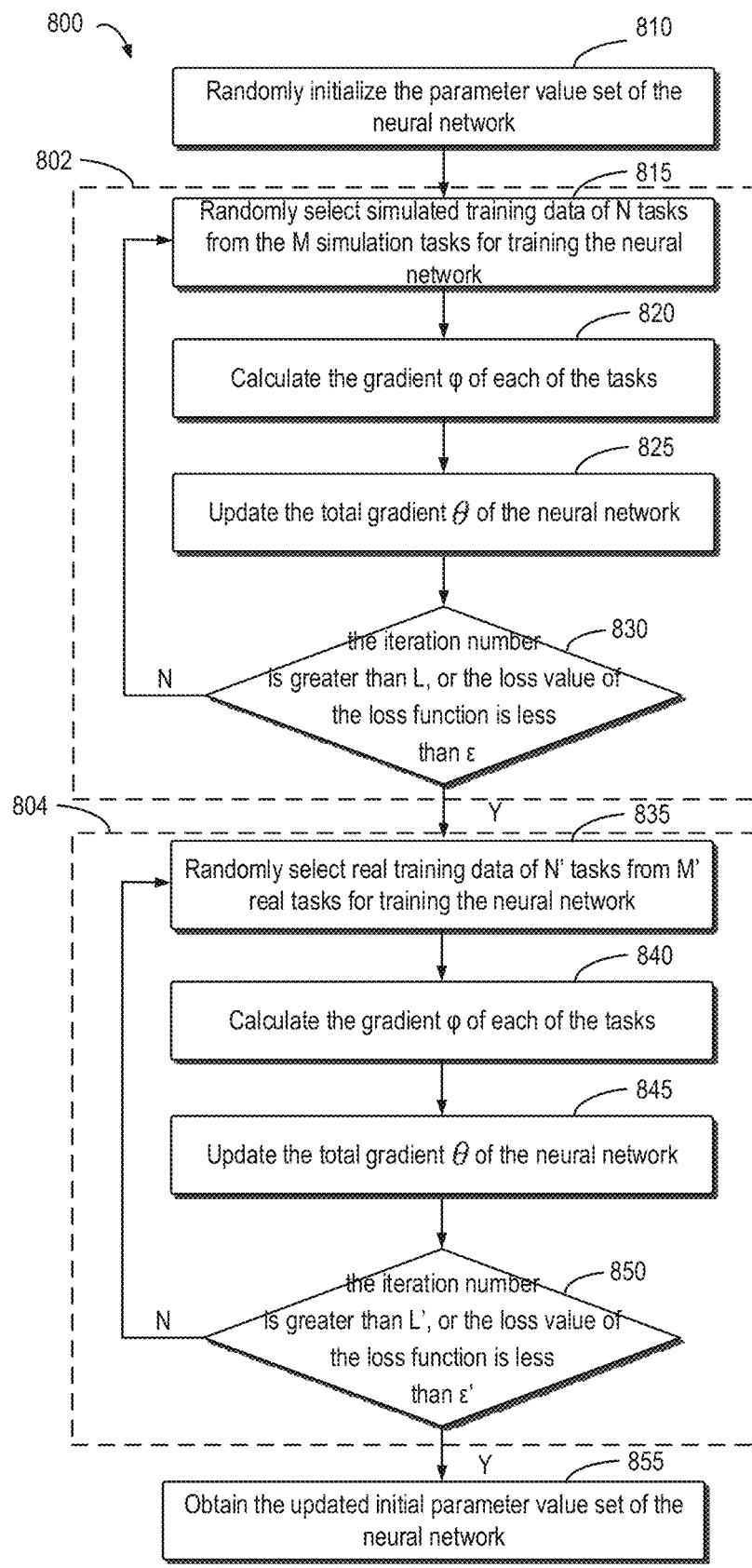
FIG. 8 illustrates a flowchart of a process for updating the initial parameter value set of the neural network in accordance with some example embodiments of the present disclosure.

FIG. 8 illustrates a flowchart of a process 800 for updating the initial parameter value set of the neural network in accordance with some example embodiments of the present disclosure. The process 800 may be implemented by the OLT 110, for example, implemented by the parameter update module 320 in the OLT 110 of FIG. 2.

At block 810, in the initial stage, the OLT 110 randomly initializes the parameter value set of the neural network 130 to obtain a random initial parameter value set. On the basis of the random initial parameter value set, the OLT 110 executes a first training stage 802 based on the simulated training data obtained by simulation of different communication channels.

Specifically, at block 815, the OLT 110 randomly selects simulated training data of N tasks from the M simulation tasks for training the neural network 130. M and N are positive integers, and M is greater than N. Here, the simulation task refers to simulating the ONU 120's training of the neural network 130 for different communication channels, where the simulated training data is the pilot sequences that may be received at the ONU 120 after the pilot sequences sent by the OLT 100 passes through the simulated communication channel.

At block 820, the OLT 110 calculates the gradient φ of each of the N tasks, as in the above Equation (2). At block 825, the OLT 110 updates the total gradient θ of the neural network 130. At block 830, the OLT 110 determines whether the iteration number is greater than a predetermined number threshold (represented as L), or whether the loss value of the loss function is less than a predetermined loss threshold (represented as ε). If the iteration number is not greater than the predetermined number threshold and the loss value is not less than the predetermined loss threshold, the OLT 110 executes a next iteration step, including performing the operations at blocks 815, 820, and 825.

If the iteration number is greater than the predetermined number threshold L, or the loss value of the loss function is less than the predetermined loss threshold ε, the OLT 110 performs a second training stage 804 based on the real training data obtained from the ONU 120. Specifically, at block 835, the OLT 110 randomly selects real training data of N' tasks from M' real tasks for training the neural network 130. M' and N' are positive integers, and M' is greater than N'. Here, a real task refers to the training of the neural network 130 at a certain ONU 120. The real training data includes training data obtained by the ONU 120, such as the pilot sequences received by the ONU 120. Since the OLT 110 may continuously receive training data from more ONUs 120, the value of M' will increase constantly.

At block 840, the OLT 110 calculates the gradient φ of each of the N' tasks, as in the above Equation (2). At block 845, the OLT 110 updates the total gradient θ of the neural network 130. At block 850, the OLT 110 determines whether the iteration number is greater than a predetermined number threshold (represented as L'), or whether the loss value of the loss function is less than a predetermined loss threshold (represented asε'). If the iteration number is not greater than the predetermined number threshold and the loss value is not less than the predetermined loss threshold, the OLT 110 executes a next iteration step, including performing the operations at blocks 835, 840, and 845.

If the iteration number is greater than the predetermined number threshold L", or if the loss value of the loss function is less than the predetermined loss threshold ε', at block 855, the OLT 110 obtains the updated initial parameter value set of the neural network 130.

In some embodiments, the process 800 for updating the initial parameter value set of the neural network 130 may be performed periodically or in response to a specific event. For example, as mentioned above, when it is determined that the training performance indication received from one or more ONUs 120 does not satisfy the performance threshold, the OLT 110 may determine to perform the process 800 to update the currently-maintained initial parameter value set.

It should be appreciated that FIG. 8 is only an example process of updating the initial parameter value set. In some embodiments, the OLT 110 may directly perform the training of the neural network 130 based on the real training data from the ONU 120 to update the initial parameter value set. In some embodiments, the OLT 110 may use other machine learning or other training algorithms in addition to MAML to perform the training of the neural network 130. The embodiments of the present disclosure are not limited in this regard.

Figure 9:
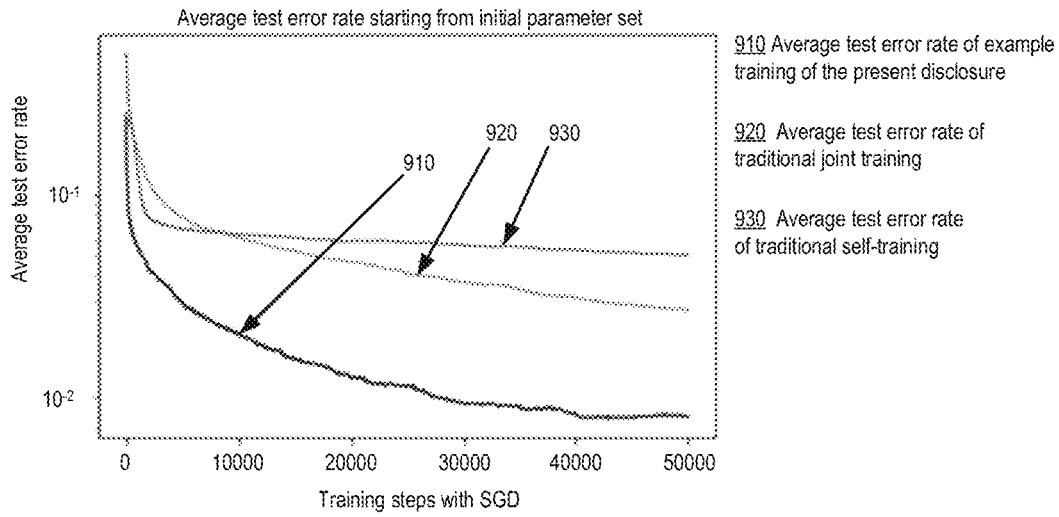
FIG. 9 illustrates a diagram of comparison of average test errors of example training according to the present disclosure and of traditional training.

FIG. 9 illustrates a diagram of comparison of an average test error of example training according to the present disclosure and an average test error of traditional training, where the horizontal axis represents the number of training steps performed by the SGD algorithm in the training stage, and the vertical axis represents the average test error rate, such as BER. The curve 910 of FIG. 9 shows the variation of the average test error rate of the neural network 130 trained according to an example of the present disclosure with the number of training steps, the curve 920 shows the variation of the average test error rate of the neural network 130 obtained through the traditional joint training with the number of training steps, and the curve 930 shows the variation of the average test error rate of the neural network 130 obtained through the traditional self-training with the number of training steps. It is assumed that both the traditional joint training and self-training are performed based on a randomly-initialized parameter set.

It can be seen by comparing the curve 910 with the curves 920 and 930 that according to the example implementations of training of the present disclosure, the neural network 130 can achieve a lower error rate at a faster speed (for example, fewer training steps). In addition, the example implementation of training according to the present disclosure may reach a maximum accuracy of 0.9922 after 50,000 sequence steps, which is greater than the accuracy of traditional joint training and traditional self-training.

Figure 10:
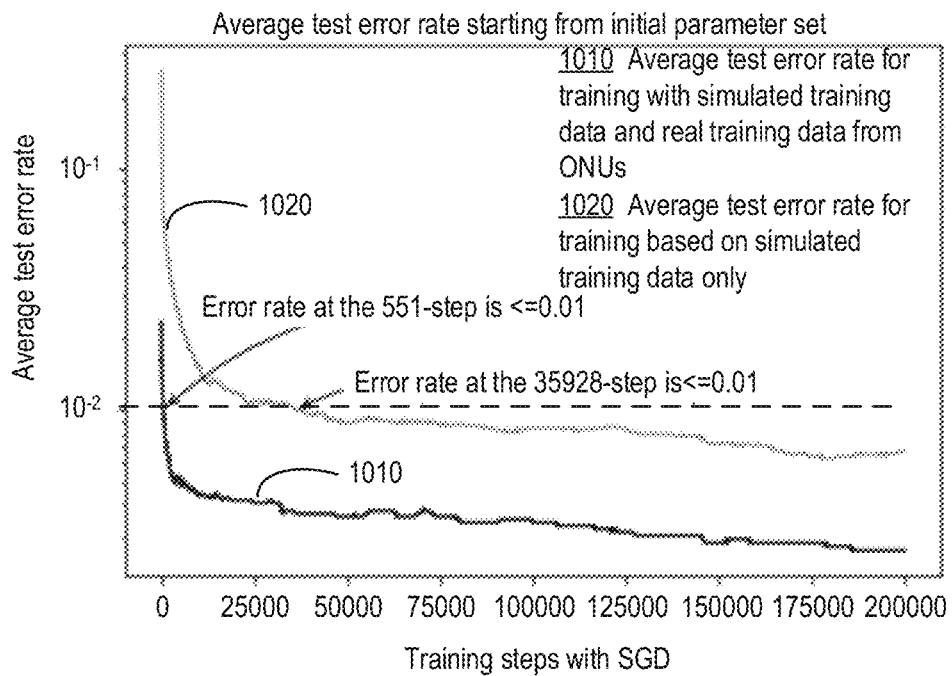
FIG. 10 illustrates a diagram of comparison of average test errors of two types of example training in accordance with some example embodiments of the present disclosure.

FIG. 10 illustrates a diagram of comparison of average test errors of two types of example training in accordance with some example embodiments of the present disclosure. The curve 1010 represents the average test error rate of the neural network 130 obtained by training (for example, the training shown in process 800) based on the simulated training data and real training data in some embodiments of the present disclosure varies with the number of training steps. The curve 1020 represents the average test error rate of the neural network 130 obtained by training only based on the simulated training data in some embodiments of the present disclosure varies with the number of training steps. It can be seen by comparing that being trained based on the simulated training data and real training data, the neural network 130 may achieve a lower error rate at a faster speed (for example, fewer training steps). For example, as shown by the arrow in FIG. 10, in the example of training based on the simulated training data and real training data, the neural network 130 may reach an error rate of less than or equal to 0.01 after 551 training steps, while in the example of training based on the simulated training data, the neural network 130 may reach an error rate of less than or equal to 0.01 after 35,928 training steps.

Figure 11:
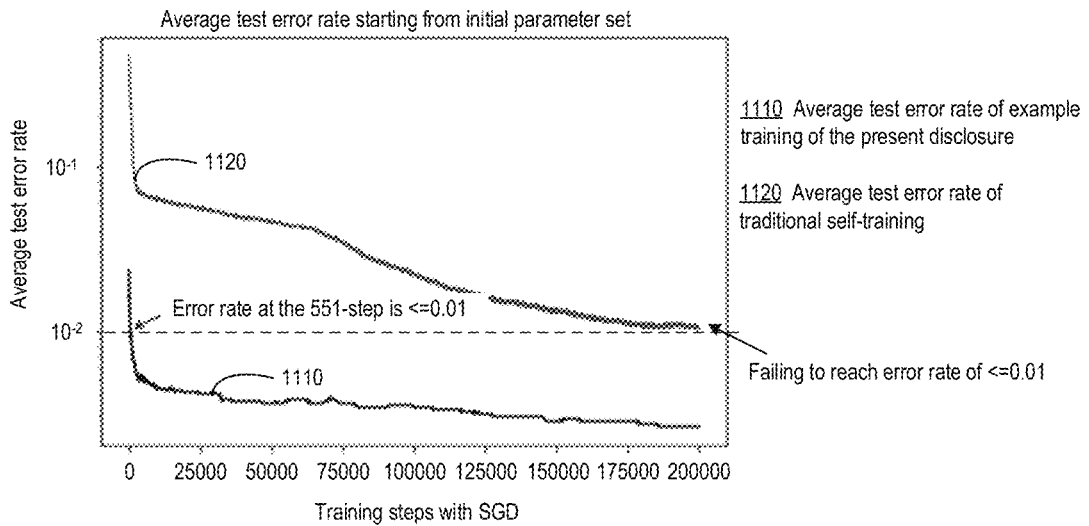
FIG. 11 illustrates a diagram of comparison of average test errors of further example training according to the present disclosure and of traditional training.

FIG. 11 illustrates a diagram of comparison of an average test error of a further example training according to the present disclosure and an average text error of traditional training. The curve 1110 represents that the average test error rate of neural network 130 obtained by training (for example, the training shown in process 800) based on simulated training data and real training data in some embodiments of the present disclosure varies with the number of training steps, and the curve 1120 represents that the average test error rate of the neural network 130 obtained through traditional self-training varies with the number of training steps. It can be seen that according to the example implementation of training of the present disclosure, the neural network 130 can reach a lower error rate at a faster speed (for example, fewer training steps), and obtain an error rate of less than or equal to 0.01 after 551 training steps. In contrast, the traditional self-training may require more than 200,000 training steps to reach an error rate of 0.01. According to the example implementations of the training of the present disclosure, a maximum accuracy rate 0.9974 can be achieved, and is greater than the accuracy rate of 0.9898 in the traditional self-training.

Figure 12:
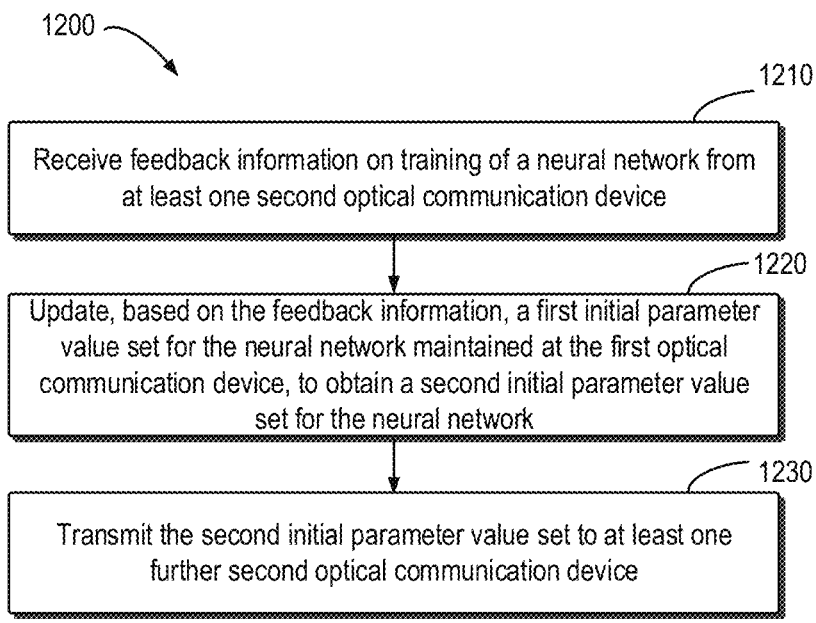
FIG. 12 illustrates a flowchart of a method implemented at a first optical communication device in accordance with some example embodiments of the present disclosure.

FIG. 12 illustrates a flowchart of a method 1200 implemented at a first optical communication device in accordance with some example embodiments of the present disclosure. The first optical communication device for example may be an OLT 110 in FIG. 3.

As shown in FIG. 12, at block 1210, the first optical communication device receives feedback information on training of a neural network from at least one second optical communication device (e.g., an ONU(s) 120). The neural network is configured to process a signal received from the first optical communication device. The feedback information at least comprises a training performance indication for training of the neural network conducted at the at least one second optical communication device.

At block 1220, the first optical communication device updates, based on the feedback information, a first initial parameter value set for the neural network maintained at the first optical communication device, to obtain a second initial parameter value set for the neural network. At block 1230, the first optical communication device transmits the second initial parameter value set to at least one further second optical communication device, for training of the neural network to be conducted at the at least one further second optical communication device based on the second initial parameter value set.

In some embodiments, the method 1200 further comprises: transmitting the first initial parameter value set for the neural network from the first optical communication device to the at least one second optical communication device. In some embodiments, the feedback information indicates training performance of training of the neural network conducted at the at least one second optical communication device based on the first initial parameter value set.

In some embodiments, the first initial parameter value set or the second initial parameter value set is transmitted to the at least one second optical communication device or the at least one further second optical communication device respectively through at least one of the following: an activated communication channel, and forwarding by an assistance communication apparatus coupled to the at least one second optical communication device or the at least one further second optical communication device.

In some embodiments, the training performance indication comprises at least one of the following: first indication information indicating time consumption for completing the training of the neural network at the at least one second optical communication device, and second indication information indicating an error rate of the neural network after the training completed at the at least one second optical communication device.

In some embodiments, updating the first initial parameter value set based on the feedback information comprises: determining, based on the training performance indication, whether a training performance at the at least one second optical communication device satisfies a threshold performance; and updating the first initial parameter value set based on a determination that the training performance fails to satisfy the threshold performance.

In some embodiments, the feedback information further comprises at least one portion of training data used by the at least one second optical communication device for training the neural network. In some embodiments, updating the first initial parameter value set based on a determination that the training performance fails to satisfy the threshold performance comprises: in accordance with a determination that the training performance fails to satisfy the threshold performance, training the neural network based on the at least one portion of the training data and the first initial parameter value set, to update the first initial parameter value set to the second initial parameter value set.

In some embodiments, the feedback information further comprises at least one portion of training data used by a respective one of a plurality of second optical communication devices for training the neural network. In some embodiments, training the neural network comprises: training the neural network through a Model-Agnostic Meta-Learning (MAML) process based on the at least one portion of training data used by the respective one of the plurality of second optical communication devices for training the neural network.

In some embodiments, the method 1200 further comprises: transmitting a plurality of pilot sequences to the at least one second optical communication device, to be used as training data for the neural network at the at least one second optical communication device.

In some embodiments, transmitting the plurality of pilot sequences comprises: carrying the plurality of pilot sequences into predetermined segments of respective payload portions of a plurality of messages with a predetermine frame structure; and transmitting the plurality of messages to the at least one second optical communication device.

In some embodiments, the neural network is configured to perform equalization processing on the signal received from the first optical communication device.

In some embodiments, the first optical communication device comprises an optical line terminal, and at least one of the at least one second optical communication device and the at least one further second optical communication device comprises an optical network unit.

Figure 13:
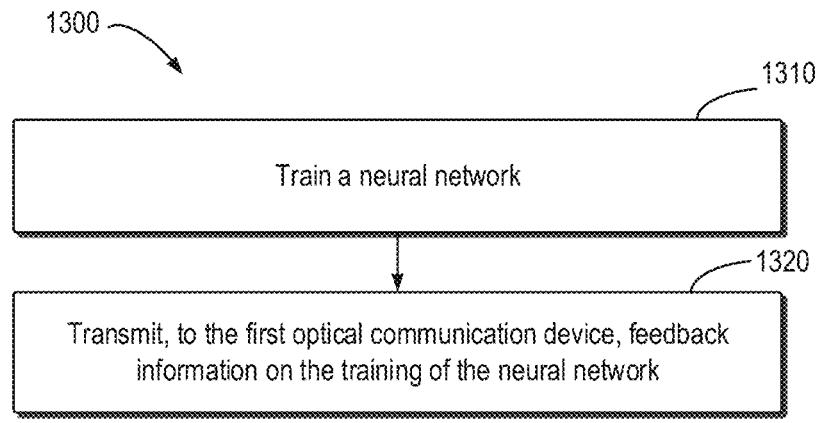
FIG. 13 illustrates a flowchart of a method implemented at a second optical communication device in accordance with some example embodiments of the present disclosure.

FIG. 13 illustrates a flowchart of a method 1300 implemented at a second optical communication device in accordance with some example embodiments of the present disclosure. The second optical communication device for example may be an ONU 120 in FIG. 3.

As shown in FIG. 13, at block 1310, the second optical communication device trains a neural network which is configured to process a signal received from a first optical communication device (e.g., the OLT 110). At block 1320, the second optical communication device transmits, to the first optical communication device, feedback information on the training of the neural network, the feedback information at least comprising a training performance indication for the training of the neural network conducted at the second optical communication device.

In some embodiments, the method 1300 further comprises: receiving a first initial parameter value set for the neural network from the first optical communication. In some embodiments, training the neural network comprises: training the neural network based on the first initial parameter value set.

In some embodiments, the method 1300 further comprises: receiving a second initial parameter value set for the neural network from the first optical communication device, the second initial parameter value set being determined by updating a first initial parameter value set for the neural network by the first optical communication device based on feedback information received from at least one further optical communication device. In some embodiments, training the neural network comprises: training the neural network based on the second initial parameter value set.

In some embodiments, the first initial parameter value set or the second initial parameter value set is received through at least one of the following: an activated communication channel, and forwarding by an assistance communication apparatus coupled to the second optical communication device.

In some embodiments, the training performance indication comprises at least one of the following: first indication information indicating time consumption for completing the training of the neural network at the second optical communication device, and second indication information indicating an error rate of the neural network after the training completed at the second optical communication device.

In some embodiments, the feedback information further comprises at least one portion of training data used by the second optical communication device for training the neural network.

In some embodiments, training the neural network comprises: receiving a plurality of pilot sequences from the first optical communication device; and training the neural network by using the received plurality of pilot sequences as training data.

In some embodiments, receiving the plurality of pilot sequences comprises: receiving a plurality of messages with a predetermine frame structure from the first optical communication device; and extracting the plurality of pilot sequences from predetermined segments of respective payload portions of the plurality of messages.

In some embodiments, the neural network is configured to perform equalization processing on the signal received from the first optical communication device.

In some embodiments, the first optical communication device comprises an optical line terminal, and the second optical communication device comprises an optical network unit.

Figure 14:
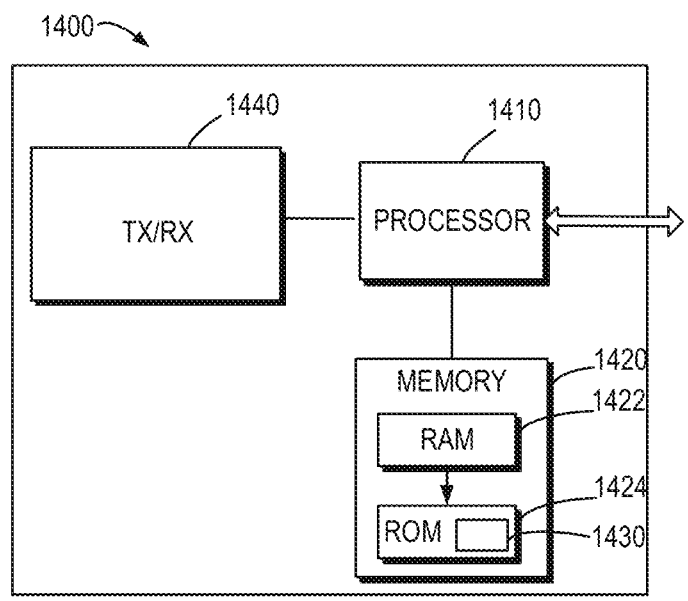
FIG. 14 illustrates a simplified block diagram of an electronic device suitable for implementing embodiments of the present disclosure.

FIG. 14 is a simplified block diagram of a device 1400 suitable for implementing embodiments of the present disclosure. The device 1400 may be provided to implement a communication device, for example, the OLT 110 and the ONU 120 shown in FIG. 1 and FIG. 3. As shown, the device 1400 includes one or more processors 1410, one or more memories 1420 coupled to the processor 1410, and one or more transmitters and/or receivers (TX/RX) 1440 coupled to the processor 1410.

The TX/RX 1440 is for bidirectional communications. The TX/RX 1440 has at least one antenna to facilitate communication. The communication interface may represent any interface that is required for communication with other network elements.

The processor 1410 may be of any type suitable for the local technical network and may include one or more of the following: general purpose computers, special purpose computers, microprocessors, digital signal processors (DSPs) and one or more processors in a multicore controller architecture based on a controller. The device 1400 may have multiple processors, such as an application specific integrated circuit chip that is slaved in time to a clock which synchronizes the main processor.

The memory 1420 may include one or more non-volatile memories and one or more volatile memories. Examples of the non-volatile memories include, but are not limited to, a Read Only Memory (ROM) 1424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1422 and other volatile memories that will not last in the power-down duration.

A computer program 1430 includes computer executable instructions that are executed by the associated processor 1410. The program 1430 may be stored in the ROM 1424. The processor 1410 may perform any suitable actions and processing by loading the program 1430 into the RAM 1422.

The example embodiments of the present disclosure may be implemented by means of the program 1430 so that the device 1400 may perform any process of the disclosure as discussed with reference to FIGS. 3 to 13. The embodiments of the present disclosure may also be implemented by hardware or by a combination of software and hardware.

Figure 15:
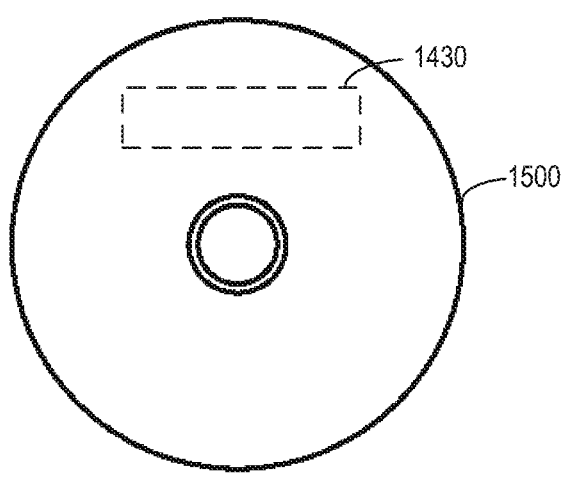
FIG. 15 illustrates a schematic diagram of a computer-readable medium suitable for implementing embodiments of the present disclosure.

In some example embodiments, the program 1430 may be tangibly contained in a computer readable medium which may be included in the device 1400 (such as in the memory 1420) or other storage devices that are accessible by the device 1400. The device 1400 may load the program 1430 from the computer readable medium to the RAM 1422 for execution. The computer readable medium may include any types of tangible non-volatile storage, such as ROM, EPROM, a flash memory, a hard disk, CD, DVD, and the like. FIG. 15 illustrates an example of the computer readable medium 1500 which may be in form of CD or DVD. The computer readable medium 1500 has the program 1430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be appreciated that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out the methods 300 and 400 as described above with reference to FIG. 3 and FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like. Examples of signals may include electrical, optical, radio, acoustic, or other forms of propagated signals, such as carrier waves, infrared signals, and the like.

A computer-readable medium may be any tangible medium that contains or stores a program used in or related to an instruction execution system, apparatus, or device. The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In addition, although the operations of the method of the present disclosure are described in a specific order in the drawings, this does not require or imply that these operations must be performed in the specific order, or that all the operations shown must be performed to achieve a desired result. Instead, the order of executing the steps depicted in the flowchart may be changed. Additionally or alternatively, some steps may be omitted, a plurality of steps may be combined into one step for execution, and/or one step may be divided into a plurality of steps for execution. It should also be noted that the features and functions of two or more devices according to the present disclosure may be embodied in one device. Instead, the features and functions of one device described above may be embodied by a plurality of devices.

Although the present disclosure has been described with reference to several specific embodiments, it should be appreciated that the present disclosure is not limited to the disclosed specific embodiments. The present disclosure is intended to cover various modifications and equivalent arrangements included within the spirit and scope of the appended claims.

What is claimed is:

1. A method for optical communication, comprising:
   receiving, at a first optical communication device, feedback information on training of a neural network from at least one second optical communication device, the neural network being configured to process a signal received from the first optical communication device, the feedback information at least comprising a training performance indication for training of the neural network conducted at the at least one second optical communication device, the training performance indication including at least first indication information indicating time consumption for completing the training of the neural network at the at least one second optical communication device, the first indication information including at least a number of epochs used by the at least one second optical communication device to complete the training of the neural network, and second indication information including a bit error rate of the neural network after the training of the neural network is completed at the at last one second optical communication device;

updating, based on the feedback information, a first initial parameter value set for the neural network maintained at the first optical communication device, to obtain a second initial parameter value set for the neural network; and transmitting the second initial parameter value set to at least one further second optical communication device, for training of the neural network to be conducted at the at least one further second optical communication device based on the second initial parameter value set.

2. The method of claim 1, further comprising:
transmitting the first initial parameter value set for the neural network from the first optical communication device to the at least one second optical communication device, and
wherein the feedback information indicates training performance of training of the neural network conducted at the at least one second optical communication device based on the first initial parameter value set.

3. The method of claim 2, wherein the first initial parameter value set or the second initial parameter value set is transmitted to the at least one second optical communication device or the at least one further second optical communication device respectively through at least one of the following:
an activated communication channel, and
forwarding by an assistance communication apparatus coupled to the at least one second optical communication device or the at least one further second optical communication device.

4. The method of claim 1, wherein updating the first initial parameter value set based on the feedback information comprises:
determining, based on the training performance indication, whether a training performance at the at least one second optical communication device satisfies a threshold performance; and
updating the first initial parameter value set based on a determination that the training performance fails to satisfy the threshold performance.

5. The method of claim 1, further comprising:
transmitting a plurality of pilot sequences to the at least one second optical communication device, to be used as training data for the neural network at the at least one second optical communication device.

6. The method of claim 5, wherein transmitting the plurality of pilot sequences comprises:

carrying the plurality of pilot sequences into predetermined segments of respective payload portions of a plurality of messages with a predetermine frame structure; and
transmitting the plurality of messages to the at least one second optical communication device.

7. The method of claim 1, wherein the neural network is configured to perform equalization processing on the signal received from the first optical communication device.

8. A first optical communication device, comprising:
at least one processor; and
at least one memory coupled with the at least one processor, the at least one memory having instructions stored therein,
the at least one memory and the instructions are configured, with the at least one processor, to cause the first optical communication device to perform the method of claim 1.

9. The method of claim 1, wherein the second indication information includes a loss value of a loss function of the neural network after the training of the neural network is completed at the at least one second optical communication device.

10. A method for optical communication, comprising:
receiving, at a first optical communication device, feedback information on training of a neural network from at least one second optical communication device, the neural network being configured to process a signal received from the first optical communication device, the feedback information at least including
a training performance indication for training of the neural network conducted at the at least one second optical communication device, and
at least one portion of training data used by the at least one second optical communication device for training the neural network;
updating, based on the feedback information, a first initial parameter value set for the neural network maintained at the first optical communication device, to obtain a second initial parameter value set for the neural network, the updating the first initial parameter value set based on the feedback information including
determining, based on the training performance indication, whether a training performance at the at least one second optical communication device satisfies a threshold performance, and
updating the first initial parameter value set based on a determination that the training performance fails to satisfy the threshold performance by training the neural network based on the at least one portion of the training data and the first initial parameter value set, to update the first initial parameter value set to the second initial parameter value set; and
transmitting the second initial parameter value set to at least one further second optical communication device, for training of the neural network to be conducted at the at least one further second optical communication device based on the second initial parameter value set.

11. The method of claim 10, wherein the feedback information further comprises at least one portion of training data used by a respective one of a plurality of second optical communication devices for training the neural network, and training the neural network comprises:
training the neural network through a Model-Agnostic Meta-Learning (MAML) process based on the at least one portion of training data used by the respective one of the plurality of second optical communication devices for training the neural network.

12. A method for optical communication, comprising:
training a neural network at a second optical communication device based on a first initial parameter value set, the neural network being configured to process a signal received from a first optical communication device;
transmitting, to the first optical communication device, feedback information on the training of the neural network, the feedback information at least comprising a training performance indication for the training of the neural network conducted at the second optical communication device, the training performance indication including at least
first indication information indicating time consumption for completing the training of the neural network at the second optical communication device, the first indication information including at least a number of epochs used by the second optical communication device to complete the training of the neural network, and
second indication information including a bit error rate of the neural network after the training of the neural network is completed at the second optical communication device; and
receiving a second initial parameter value set for the neural network from the first optical communication device.

13. The method of claim 12, further comprising:
receiving the first initial parameter value set for the neural network from the first optical communication device.

14. The method of claim 13, wherein the first initial parameter value set or the second initial parameter value set is received through at least one of the following:
an activated communication channel, and
forwarding by an assistance communication apparatus coupled to the second optical communication device.

15. The method of claim 12, further comprising:
receiving the second initial parameter value set for the neural network from the first optical communication device, the second initial parameter value set being determined by updating the first initial parameter value set for the neural network by the first optical communication device based on feedback information received from at least one further optical communication device, and
wherein the training the neural network comprises: training the neural network based on the second initial parameter value set.

16. The method of claim 12, wherein the feedback information further comprises at least one portion of training data used by the second optical communication device for training the neural network.

17. The method of claim 12, wherein training the neural network comprises:
receiving a plurality of pilot sequences from the first optical communication device; and
training the neural network by using the received plurality of pilot sequences as training data.

18. The method of claim 17, wherein receiving the plurality of pilot sequences comprises:
receiving a plurality of messages with a predetermine frame structure from the first optical communication device; and
extracting the plurality of pilot sequences from predetermined segments of respective payload portions of the plurality of messages.

19. The method of claim 12, wherein the neural network is configured to perform equalization processing on the signal received from the first optical communication device.

20. A second optical communication device, comprising:
at least one processor; and
at least one memory coupled with the at least one processor, the at least one memory having instructions stored therein,
the at least one memory and the instructions are configured, with the at least one processor, to cause the second optical communication device to perform the method of claim 12.

21. The method of claim 12, wherein the second indication information includes a loss value of a loss function of the neural network after the training of the neural network is completed at the second optical communication device.

* * * * *